(12) United States Patent
Smith et al.

(10) Patent No.: US 8,562,923 B1
(45) Date of Patent: Oct. 22, 2013

(54) PROCESS FOR OBTAINING PURE LITHARGE FROM LEAD ACID BATTERY PASTE

(71) Applicant: Toxco, Inc., Anaheim, CA (US)

(72) Inventors: W. Novis Smith, Philadelphia, PA (US); Steven A. Kinsbursky, Long Beach, CA (US)

(73) Assignee: Toxco, Inc., Anaheim, CA (US)

( * ) Notice: Subject to any disclaimer, the term of this patent is extended or adjusted under 35 U.S.C. 154(b) by 0 days.

(21) Appl. No.: 13/660,548

(22) Filed: Oct. 25, 2012

(51) Int. Cl.
*C22B 13/00* (2006.01)

(52) U.S. Cl.
USPC .................. 423/92; 423/93; 423/619; 429/49

(58) Field of Classification Search
USPC .................................. 423/92, 93, 619; 429/49
See application file for complete search history.

(56) References Cited

U.S. PATENT DOCUMENTS

| | | | | |
|---|---|---|---|---|
| 2,152,242 A | * | 3/1939 | Curtin ............................ | 423/95 |
| 4,222,769 A | * | 9/1980 | Okuda et al. .................... | 75/432 |
| 4,769,116 A | * | 9/1988 | Olper et al. .................... | 205/599 |
| 5,211,818 A | * | 5/1993 | Moure et al. ................... | 205/599 |
| 7,507,496 B1 | * | 3/2009 | Kinsbursky et al. ............. | 429/49 |
| 7,785,561 B1 | * | 8/2010 | Smith et al. .................... | 423/619 |
| 8,323,595 B1 | * | 12/2012 | Smith et al. .................... | 423/89 |
| 2006/0239903 A1 | * | 10/2006 | Guerriero et al. ............. | 423/619 |
| 2010/0043600 A1 | * | 2/2010 | Martini .......................... | 75/743 |

FOREIGN PATENT DOCUMENTS

WO 99/44942 * 9/1999

* cited by examiner

*Primary Examiner* — Steven Bos
(74) *Attorney, Agent, or Firm* — RatnerPrestia

(57) ABSTRACT

The present invention relates to the recovery of high purity litharge from spent lead acid battery paste at a low temperature which does not produce sulfur dioxide. In the process lead acetate is produced which is converted to pure litharge.

10 Claims, No Drawings

PROCESS FOR OBTAINING PURE LITHARGE FROM LEAD ACID BATTERY PASTE

FIELD OF THE INVENTION

The present invention relates to the recovery of highly pure litharge (PbO) from spent lead acid battery paste. More particularly, there is provided a low temperature process which does not generate sulfur dioxide and a novel process step of converting lead acetate to PbO is used.

BACKGROUND OF THE INVENTION

The conversion of the dominant recycle stream (about 60% of the weight) from crushing lead acid batteries to a useful product has been costly, highly energy intensive and generates considerable hazardous dust sulfur dioxide and carbon dioxide and carbon monoxide pollution when performed as it is in the smelters. The recovered lead metal from the grids is simply smelted while the lead sulfate/red lead/lead metal powder paste containing antimony and barium sulfate waste must be mixed with carbon and smelted in the furnaces along with the lead metal grid to achieve a practical and the lowest cost route currently for handling the paste material. That barium sulfate is usually added at 0.5 to 2% levels in lead acid batteries to control lead sulfate crystal size during electrode charging/discharging. The smelting with carbon converts the lead sulfate to sulfur dioxide which must be scrubbed and along with the extra lead dust and carbon powder which is generated. This is also a very energy intensive and polluting process. A better way is needed particularly when the smelters are under intense pressure to cut their emissions of particulate especially lead and sulfur dioxide.

The lead metal from the smelters is purified by sparging and forming a flux which carries out contaminates resulting in further losses and costs. For the electrodes in making lead acid batteries, a form of litharge is produced by the slow oxidation of molten lead metal (99.999% purity) at 400-500° C. to form an impure form of a mix of litharge and containing fine lead metal particles at 15-30% by weight. It is too expensive and too much time is required to try to oxidize this remaining lead to the litharge. The desired form of the PbO is the litharge (tetragonal-yellow-orange color) allotrope. This process also forms some of the white high temperature form called massicot, which is not desired, because of its slower reaction during electrode formation.

In U.S. Pat. No. 4,222,769 spent battery paste is desulfurized and then transformed into metallic lead by roasting in the presence of a carbon reducing agent.

U.S. Pat. No. 4,769,116 discloses treating exhausted lead acid battery paste with sodium hydroxide to produce a solution of sodium sulfate and a desulfurized paste which is subjected to electro winning to produce metallic lead.

U.S. Patent Publication No. 2006/0239903 to Guerriero discloses high purity lead hydroxide and lead oxide from spent acid battery paste that has been desulfurized and converted into a carbonate or hydroxide and then calcinated at 500° C. to obtain pure PbO. The multi-step process includes subsequent treating with acetic acid. The lead acetate solution was treated with an alkali or alkaline earth hydroxide to produce lead hydroxide.

U.S. Patent Publication No. 2010/043600 to Martini discloses a process for recovery of high purity lead compounds from electrode paste slime. The process includes dissolving lead oxide in the paste in suitable acid, reducing any insoluble lead dioxide with hydrogen peroxide, a sulfite or sulfurous anhydride, converting the lead oxide to lead sulfate and then treating the lead sulfate in a solution containing an acetate, calcinating the desulfurized material to get impure lead monoxide followed by leaching of the lead monoxide with acetic acid followed by filtering and then treating further with an alkali hydroxide or alkaline earth hydroxide to obtain soluble acetates to get a precipitate of lead hydrate or lead monoxide.

U.S. Pat. No. 7,507,496 to Smith et al relates to the selective removal of sulfate from battery paste and recovering $Pb_3O_4$ which has small amounts of impurities and can be separated from the impurities by dissolution.

U.S. Pat. No. 5,211,818 discloses a process wherein the paste sludge resulting from the exhausted batteries is treated with a solution of ammonium sulfate and the metallic lead constituent is recovered by electrowinning.

International Publication No. WO99/44942 discloses a process of producing lead monoxide from spent lead batteries using fluxing agents and an organic reducer in the calcinations step at a temperature of 400° C.-450° C.

Typically litharge is made in the Barton process by heating lead metal to 380-500° C. to keep it molten and passing controlled amounts of air or oxygen through it to partially oxidize it to litharge containing 25% lead with strong agitation. The lead oxide (litharge) that forms initially contains very fine lead metal which is intimately mixed into the litharge/massicot lead oxide mix which more slowly reacts in positive electrode plate formation.

SUMMARY OF THE INVENTION

According to the invention there is provided a process for obtaining high purity litharge (PbO) with the steps which comprise:
a) Treating lead acid battery paste with a reducing agent at a pH less than 4;
b) Treating the resulting composition of step a) with a base;
c) Filtering the resulting composition of step b) and washing the resulting filter cake;
d) Forming an aqueous slurry with the filter cake of step c) and adding acetic acid to form a lead acetate solution;
e) Filtering the product of step d) and then treating the aqueous filtrate with a base selected from the group consisting of sodium hydroxide and potassium hydroxide to form the insoluble litharge, and then
f) Recovering the litharge from step e).

It is a general object of the invention to obtain high purity litharge (PbO) from spent lead acid battery paste.

It is another object of the invention to prepare red lead ($Pb_3O_4$) with the litharge of the invention.

These and other objects and advantages of the invention will be better understood by a reading of the Preferred Embodiments of the Invention and the Example.

DESCRIPTION OF PREFERRED EMBODIMENTS OF THE INVENTION

According to the present invention there is provided a process for obtaining high purity litharge (PbO) from spent lead acid battery paste which comprises the steps of;
1) Treating lead acid battery paste with a reducing agent selected from the group consisting of sodium meta bi-sulfite and $SO_2$, in an acid medium; Preferably, sodium meta sulfite is used in aqueous sulfuric acid to form insoluble divalent lead sulfate compounds;
2) Adding a base selected from the group consisting of an alkali hydroxide and/or sodium carbonate to the slurry of step 1);

3) Filtering the aqueous slurry from step 2) to form a filter cake;
4) Adding the filter cake of step 3) to a quantitative amount of acetic acid in water to form a concentrated solution of lead acetate;
5) Filtering the solution of step 4) to remove any unreacted products; and then
6) Adding a base selected from the group consisting of sodium hydroxide and potassium hydroxide to the filtrate of step 5) at a temperature of about 50 to 100° C., preferably 82° C. to form high purity PbO which is recovered.

The resultant litharge can be readily converted to red lead ($Pb_3O_4$) by heating the litharge at about 475° C. in air for about three hours.

Example 1

The process is composed of three steps which must be performed in sequence for obtaining high yields, low costs, and high purity litharge.

In the first step, the screened lead acid paste (preferably −140 mesh) free of the plastic and metal grids and collectors from the crushed lead acid batteries is slurried in water and a reducing agent is added (preferably sulfur dioxide or the equivalent sodium bisulfite (sodium meta bisulfite) in an acid medium (pH<4, preferably <2). This is reacted with cooling preferably about room temperature in a closed vessel. This reaction is exothermic at a pH of <2 and rapid reduces most of the red lead and higher valence lead compounds to the plus two lead. A base such as sodium hydroxide (or sodium carbonate) is added to convert the insoluble lead sulfate and lead metal powder to the insoluble impure lead hydroxide/lead or carbonate metal powder with the sulfate forming sodium sulfate solution which is then removed by filtration. This slurry is filtered and the cake washed free of sodium sulfate and introduced into a stainless steel reactor containing water and acetic acid. All of the lead metal powder remains insoluble in the cake. (The lead content of the filtrate is less than 0.1%).

In the second step, the impure cake is added to water and a quantitative amount of acetic acid to quantitatively dissolve all the lead hydroxide (lead carbonate in the case of when soda ash is used n the first step instead of sodium hydroxide) as lead acetate. The solution now consists of a concentrated lead acetate solution with the insoluble phase in the slurry now consisting of the insoluble fine lead metal powder from the crushing action of the battery breaker, unreacted red lead, and a small amount of impurities. This slurry is adjusted to pH 4-5 to ensure total reaction and stirred at 50° C. for complete solution of the lead acetate. The slurry is filtered to produce a clear solution of concentrated lead acetate (20-25% weight concentration and then the pH is adjusted to about 7-8 with sodium hydroxide.

In the third step, the clear lead (pH 7-8) acetate was added to a SS reactor and heated to about 50-90° C. (preferably 82° C.), and 50% sodium hydroxide solution was added rapidly with very good agitation to achieve a pH>10 (preferably about 11) with an exothermic reaction occurring. A pale yellow to orange precipitate was formed and becomes more intense with continued heating and stirring over the next 10-30 minutes. The temperature was maintained at >90° C. The pale orange slurry was filtered hot after 30 minutes. The yield of high purity (tetragonal-yellow/orange) litharge was quantitative based on the lead in solution. The filter cake was washed until the pH was 9-10. The lead content of the filtrate was <0.07% lead indicating essentially total recovery. The product litharge was treated in an oven to >120 to 180° C. to ensure it was dry and free of volatile impurities. The dried cake was milled to produce a −100 mesh powder which was used directly into making the paste for forming lead acid battery electrodes.

The litharge can be readily converted directly into red lead ($Pb_3O_4$) at 475° C. over three hours in air. This high purity material is also used in making high performance lead acid positive battery electrodes.

Example 2

To 5 kg of dry lead acid battery paste (−140 mesh) was added 3.5 liters of water with stifling and then 500 g of sulfuric acid was added to obtain a pH<1. The mixture was cooled to 18° C. and then;

650 g of sodium meta bisulfite in 2l of water (25% solution) was gradually added. After 2 hours, the slurry was heated to 50° C. Then solid sodium carbonate (soda ash) was added until pH 4 and then until pH 10 then heated at 60° C. for two hours while maintaining the pH at 10-11 with additional sodium carbonate. The mixture was filtered and the filter cake was washed three times until a pH less than 9.

8 liters of DI water was added to a SS container. The filter cake from Step 1 was added to the stirred solution of 8 liters water and 1700 g acetic acid with the pH maintained at 4.5-5. The slurry was heated to 50-60° C. and stirred one hour and the pH was maintained at 4.5-5. This slurry was filtered to obtain a clear solution. The filter cake was washed once with a minimum amount of water. The pH of this filtrate was adjusted to 8 with 50% sodium hydroxide, settled for about 30-60 minutes and then polished filtered.

The filtrate was heated to 80° C. and then added 2000 g of 50% sodium hydroxide was added to the solution to precipitate the litharge (yellow to pale orange). The pH was about 10.5 to 11. The reactor was heated to maintain the heat at 90° C. and stirred while protecting from air ($CO_2$) for 30 minutes and then filtered hot.

The filter cake was washed three times to obtain a pH of <9.5 in the filtrate.

The damp cake was weighed and then placed into a drying tray and dried at 180° C. for at least 6 hours. Reweighed on drying the yield was estimated to be about 2.2 kg.

Example 3

Step 1:

5.0 kg of dry lead acid battery paste (−140 mesh) containing about 10-15% lead alloy powder was added to a polypropylene 5 gallon stainless steel container with lid, stirrer thermocouple, and heating tape.

3.5 liters of water was added with stifling.

500 g sulfuric acid was slowly added and the pH was kept at <1. The mixture was stirred and cooled to 18° C. with ice additive to the container.

650 g of sodium meta bisulfate in 2 L of water (25% solution) was gradually added over 1 hour while adding ice as necessary to maintain the temperature at 18-20° C. After the addition was complete, the pH was adjusted to pH 1-2. Volume at this point was about 6.5 liters.

Stirring was continued for an additional hour then checked if there was a slight odor of $SO_2$ in the reactor to indicate that it was still in excess. Then the mixture was heated up to 50° C. for 30 minutes to drive off excess sulfur dioxide which is scrubbed.

300 g of sodium carbonate was added until pH 4 and then continued on with about 1500 g of 50% solid sodium hydroxide added until pH 11 and then heated at 60° C. for two hours while maintaining the pH at 11 with additional sodium hydroxide.

The mixture was filtered and the cake washed three times until a pH of less than 9.

Step 2:

The filter cake from Step 1 was added to a SS container equipped with a heating tape and stirrer together with 8 liters of water. To the stirred solution was added 1700 g of acetic acid until the pH remained at 4.5-5. The slurry was then heated up to 50-60° C. and stirred one hour. The pH was maintained at 4.5-5.

The pH of the mixture was adjusted to 8 to 8.5 with 50% sodium hydroxide (about 400 g) and let to settle for about 30-60 minutes and then filtered through P2 filter paper into a polyethylene vacuum filter flask changing filter papers when necessary. The filter cake was washed once with minimum amount of water. Then the filtrate was polish pressure filtered (10 psi) through a 0.5 micron filter cartridge to obtain a sparkling solution into a large SS container equipped with insulated heating tape and stirrer.

Step 3:

The solution was then stirred and heated to 82° C. and then 2000 g 50% sodium hydroxide was added to the solution to precipitate the litharge (yellow to pale orange). The pH was about 10.5 to 11. The reactor was covered and the heat was maintained to keep the slurry at 90° C. and stirred while protecting from air ($CO_2$) for 30 minutes.

The filter cake was washed three times to obtain a pH of <9.5 in the filtrate.

The damp cake was weighed and then placed into a drying tray and dried at 180° C. for at least 6 hours on drying and the yield was 2.2 kg.

What is claimed is:

1. A process for obtaining high purity litharge (PbO) from spent lead acid battery paste which comprises the steps of:
   1) treating lead add battery paste with a reducing agent selected from the group consisting of sodium meta bisulfite and $SO_2$ in an acid medium to form an aqueous slurry;
   2) adding a base selected from the group consisting of an alkali hydroxide and sodium carbonate to the aqueous slurry;
   3) filtering the slurry to form a cake and washing the cake;
   4) adding the cake to a quantitative amount of acetic acid in water to form a concentrated solution of lead acetate;
   5) filtering the solution to remove any insolubles; and
   6) adding a base to the solution at an elevated temperature to form litharge, the base being selected from the group consisting of sodium hydroxide and potassium hydroxide.

2. The process of claim 1 wherein the adding the base to the solution is performed at a temperature of about 50° C. to 100° C.

3. The process of claim 1 which comprises treating the lead acid battery paste at a pH of less than 4 with said reducing agent.

4. The process of claim 3 wherein sulfuric acid is used to maintain the pH to less than 4.

5. The process of claim 1 wherein the reducing agent is $SO_2$.

6. The process of claim 1 wherein the reducing agent is sodium meta bisulfite.

7. The process of claim 1 wherein the base is sodium carbonate.

8. The process of claim 1 wherein the base is selected from the group consisting of sodium hydroxide and potassium hydroxide.

9. The process of claim 1 wherein the acid medium is formed with an acid selected from the group consisting of acetic acid and sulfuric acid.

10. The process of claim 1 wherein the litharge is further heated in air at 475° C. to form red lead.

* * * * *